United States Patent [19]

Miyata et al.

[11] Patent Number: 4,799,449
[45] Date of Patent: Jan. 24, 1989

[54] COATING APPARATUS

[75] Inventors: Katsuaki Miyata, Ikeda; Yutaka Sakuma, Toyono; Shimesu Motoyama, Asaka; Masakazu Gotou; Hiromu Shirakawa, both of Tokyo; Takamoto Makino, Sakado, all of Japan

[73] Assignee: Takeda Chemical Industries, Ltd., Japan

[21] Appl. No.: 946,135

[22] Filed: Dec. 23, 1986

Related U.S. Application Data

[63] Continuation of Ser. No. 725,317, Apr. 19, 1985, abandoned.

[51] Int. Cl.⁴ .................................. B05C 5/00
[52] U.S. Cl. ........................... 118/19; 118/20
[58] Field of Search ............. 118/19, 20, 303, 58; 427/3

[56] References Cited

U.S. PATENT DOCUMENTS 4,640,218  2/1987  Motoyama et al. ............ 118/20 X

FOREIGN PATENT DOCUMENTS 2249863  4/1974  Fed. Rep. of Germany ........ 118/19
2315882 10/1974  Fed. Rep. of Germany ........ 118/19
2805801  8/1979  Fed. Rep. of Germany ........ 118/20
3336076  4/1984  Fed. Rep. of Germany ........ 118/20

Primary Examiner—John McIntosh
Attorney, Agent, or Firm—Kane, Dalsimer, Sullivan, Kurucz, Levy, Eisele and Richard

[57] ABSTRACT

An apparatus for coating pharmaceutical tablets or the like with other material such as sugar or the like. The apparatus includes a cylindrical rotary coating pan in which the tablets are charged and tumbled, and at least one perforated area for ventilating hot gas or the like so as to dry the sugar coated on the tablets. The perforated area of the coating pan is covered by each of baffle members. The baffle members being hollow are provided at positions to cover ventilating areas in the the coating pan, formed to be at least partially increased in width from the leading edge to the trailing edge relative to the rotational direction of the coating pan, and each have a ventilating opening communicated with the ventilating areas. Each of baffle members is formed of a hollow tube polygonal or cylindrical in cross section. A ventilating member for preventing a raw material to be coated from leaking is provided at the ventilating opening of the baffle member.

3 Claims, 15 Drawing Sheets

COATING APPARATUS

This is a continuation of co-pending Ser. No. 725,317 filed on Apr. 19, 1985 now abandoned.

BACKGROUND OF THE INVENTION

1. Field of the Invention

This invention relates to a coating apparatus, more particularly, a coating apparatus for coating pharmaceutical or food tablets or the like with a layer of other medical composition or sugar etc., which apparatus includes a rotatable coating pan, the side wall of which has a ventilating area or areas for feeding dry air as a ventilating and drying mechanism.

2. Description of the Prior Art

When, in a coating apparatus, a coating material, such as a film liquid or a sugar solution, is sprayed on the surface of a material to be coated, such as tablets or a granular raw material, and thereafter, the coating material is dried, there has heretofore been adopted a method wherein the tablets as being the material to be coated are tumbled in a coating pan by the rotation of the coating pan, while heated air is blown onto the surface of a bed of the tablets to dry the tablets. However, according to the conventional method of the type described, although it is possible to relatively sufficiently dry only the tablets in the surface zone of the bed, the tablets in the inside and lower zones of the bed are insufficiently dried because the heated gas cannot reach such zones. Therefore, it takes long time to dry all of the tablets in the coating pan, and it is difficult to dry the tablets uniformly.

For eliminating these drawbacks, the present applicant has proposed a coating apparatus shown in FIG. 1 and 2, which is disclosed in the Japanese Patent Publication No. 38713/1975. This coating apparatus is provided with a ventilating and drying mechanism comprised of perforated areas 2 for ventilating air, arranged axially in a plurality of circumferential positions of whole circumference of a rotatable coating pan or rotatable drum 1, an air supply conduit 3, an exhaust or suction duct 4, and exhaust conduit 5. In this coating apparatus, the heated air blown into the coating pan 1 from the air supply conduit 3 is blown onto tablets 6 tumbled in the coating pan 1, and after passing through the bed of the tablets 6, the heated air is exhausted from the exhaust conduit 5 via the perforated area 2 and the exhaust duct 4. Therefore, this coating apparatus is used as an excellent coating apparatus in practice, because, in this coating apparatus, the heated gas can contact uniformly with the tablets 6 not only in the surface zone but also in the inside and lower zones of the bed thereof while passing through the bed of the tablets, the heat efficiency is very high, and it is possible to obtain homogeneous product dried with overall uniformity and with high productivity.

Further, as the result of the high heat efficiency provided by this coating apparatus, it is possible to perform coating operation efficiently and in low cost, using an aqueous coating solution wherein coating material is dissolved or dispersed in the water (in this connection, refer to the Japanese Patent Publication No. 5491/1980).

Moreover, in FIGS. 1 and 2, the reference numeral 7 is a rotary shaft for rotating the coating pan 1, 8 is a motor for driving the rotary shaft 7 via transmission means 9 such as a belt or a chain, 10 is a cylindrical portion which forms a charging opening through which tablets 6 to be coated are charged into the coating pan 1, and 11 is a cover for the cylindrical portion 10. These cylindrical portion 10, cover 11 and air supply conduit 3 and exhaust conduit 5 do not rotate. The connecting portions between these non-rotating members and rotating members of the coating pan 1 etc. are sealed by labyrinth type sealing means etc.

Now, in such a coating apparatus as above, there are provided a plurality of ventilating through apertures having circular, rectangular or elliptic shapes in the perforated area 2 to increase the numerical aperture of the perforated area 2 in order to reduce the resistance to the ventilation through the perforated area 2. But, there is a possibility of causing such a phenomenon that, as a large quantity of the material to be coated is processed in the coating pan, the tablets or other granular materials being coated are clogged in the ventilating apertures to block the apertures. When the ventilating apertures are blocked, the smooth flow of the heated gas is prevented to produce non-uniform ventilation, and the pressure loss of the ventilation system becomes increased or changed to make the coating operation instable. Further, it takes longer time for drying because of the reduction of the heat efficiency.

Alternatively, there is proposed other coating system, in which a powdery raw material is used in place of a portion of coating solution to reduce the energy for drying by using the above-described coating apparatus. However, in this coating system, because the powdery material is leaked through the ventilating aperture and the leaked powdery material is let out of the system through the exhaust duct and conduit, not only a product having non-uniform components is produced, but also loss of expensive powdery raw material and environmental pollution occur.

Such problems arise not only in a conical shaped coating apparatus, but also in other cylindrical coating apparatus disclosed in the Japanese Utility Model Publication No. 21466/1981, or an onion or a pear shaped coating apparatus.

Then, to eliminate the above-described drawbacks, the present applicant has proposed a construction having a baffle or scoop plate covering the ventilating areas within the coating pan (Japanese Patent Application No. 174273/1982). This construction can offer such outstanding advantages that it can prevent the leak of powdery material through ventilating areas and blocking of the ventilating areas, increase the drying efficiency, produce homogeneously coated products and so on.

Now, as the apparatus of the type described, necessity has been voiced for achieving combined effects of smoothing the material to be coated, controlling damages thereof and occurrence of noises therefrom, increasing the effect of mixture, further, raising the rate of charge and so on, in addition to the prevention of the leak of powdery material.

SUMMARY OF THE INVENTION

The present invention has been developed to eliminate the above-described drawbacks of the prior art and has as its object the provision of a coating apparatus which can not only prevent the leak of powdery material from the ventilating areas of the coating pan, but also smooth the flow of the raw material to be coated, further, prevent damages thereof and occurrence of noises therefrom and secure the rate of charge.

To this end, the present invention contemplates that the coating apparatus is provided with hollow baffle or scoop means or plates being provided at positions to cover ventilating areas in the rotatable coating pan, formed to be at least partially increased in width from the leading edge to the trailing edge relative to the rotational direction of the coating pan, and each having a ventilating opening communicated with the ventilating areas.

The coating apparatus according to the present invention can smooth the flow of the material to be coated, improve the effect of agitating and mixing, and control damages of the material to be coated and occurrence of noises.

BRIEF DESCRIPTION OF THE DRAWINGS

Other objects and advantages of the present invention will become apparent from the following detailed description taken in conjunction with preferred embodiments shown in the accompanying drawings, in which.

DETAILED DESCRIPTION OF THE PREFERRED EMBODIMENTS

Figure 3:
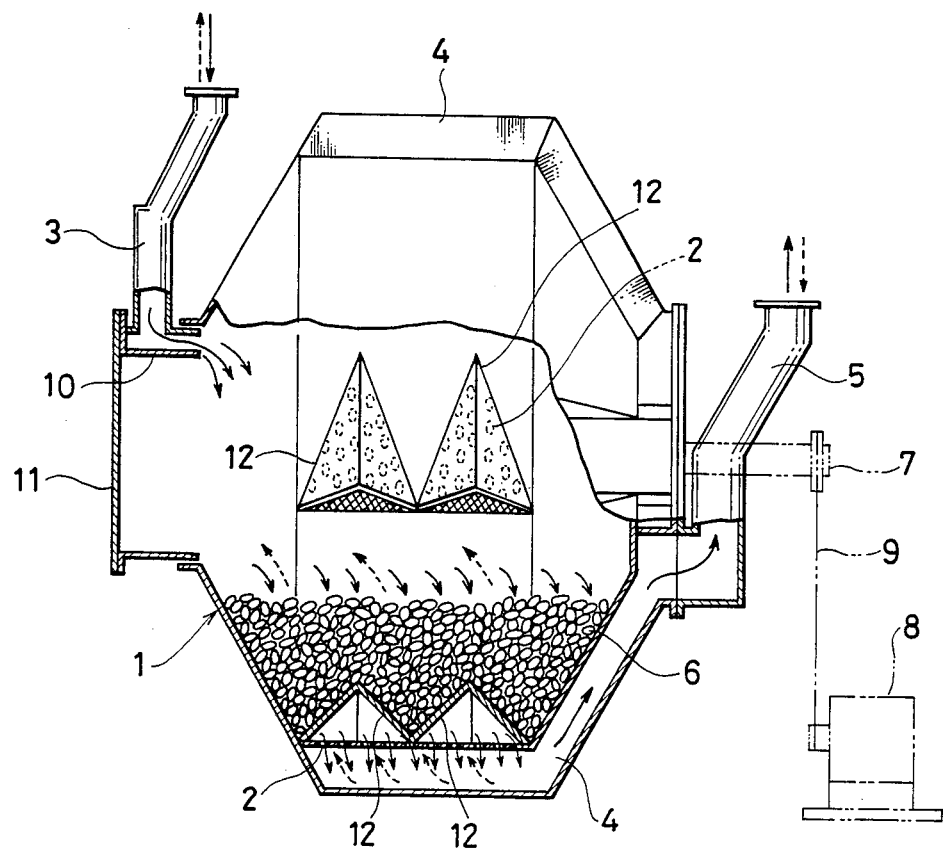
FIG. 3 is a side sectional view of a coating apparatus according to one embodiment of the present invention shown partly in broken view.
Figure 4:
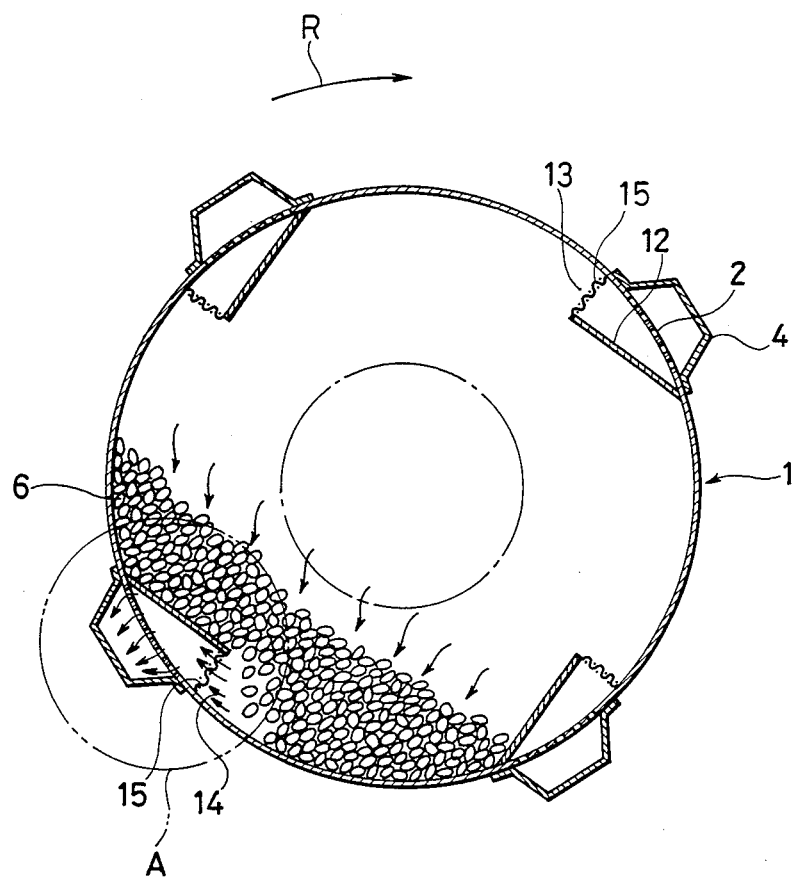
FIG. 4 is a general front sectional view of the apparatus shown in FIG. 3.
Figure 5:
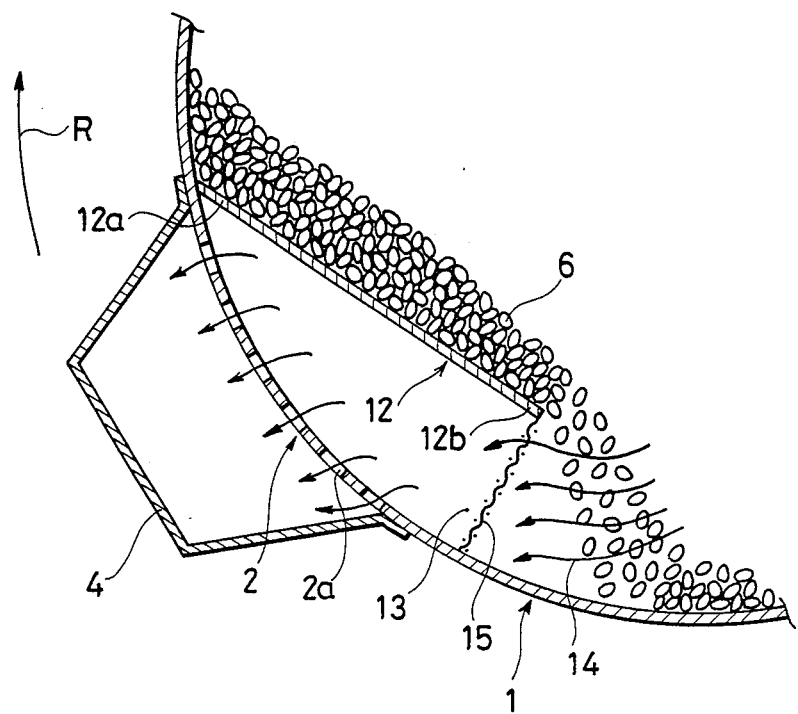
FIG. 5 is an enlarged sectional view of the portion A in FIG. 4.
Figure 6:
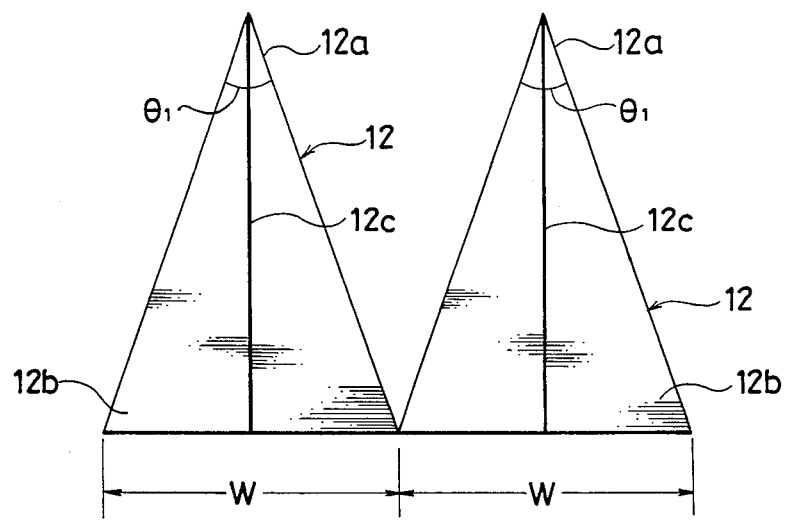
FIG. 6 is a plan view showing one embodiment of a baffle means according to the present invention.
Figure 7:
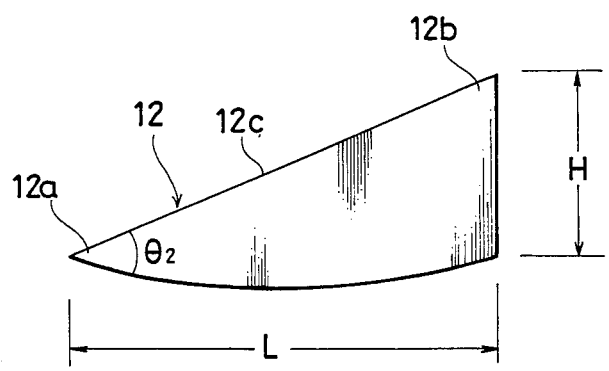
FIG. 7 is a side view thereof.
Figure 8:
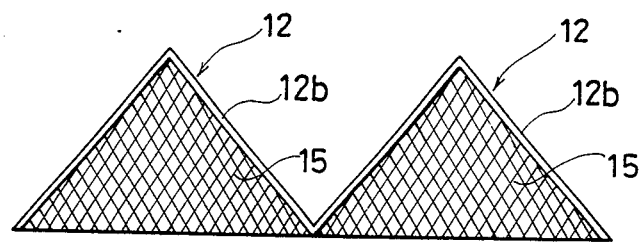
FIG. 8 is a view in looking from the side of the trailing edge thereof.
Figure 9:
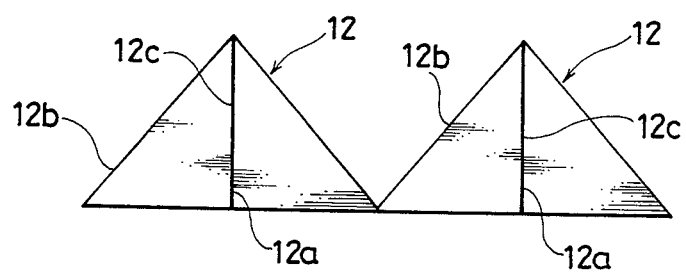
FIG. 9 is a view in looking from the side of the leading edge thereof.
Figure 10:
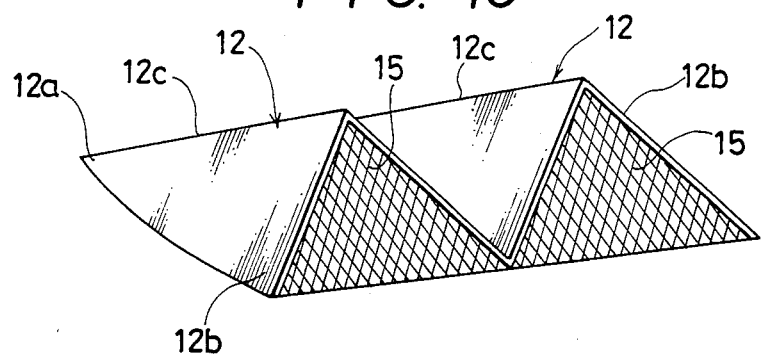
FIG. 10 is a perspective view thereof.

Referring now to the drawings, FIG. 3 is a partial side sectional view generally showing one embodiment of the coating apparatus according to the present invention, FIG. 4 is a general front sectional view of the apparatus shown in FIG. 3, and FIG. 5 is an enlarged partial sectional view of the portion A of FIG. 4.

Figure 1:
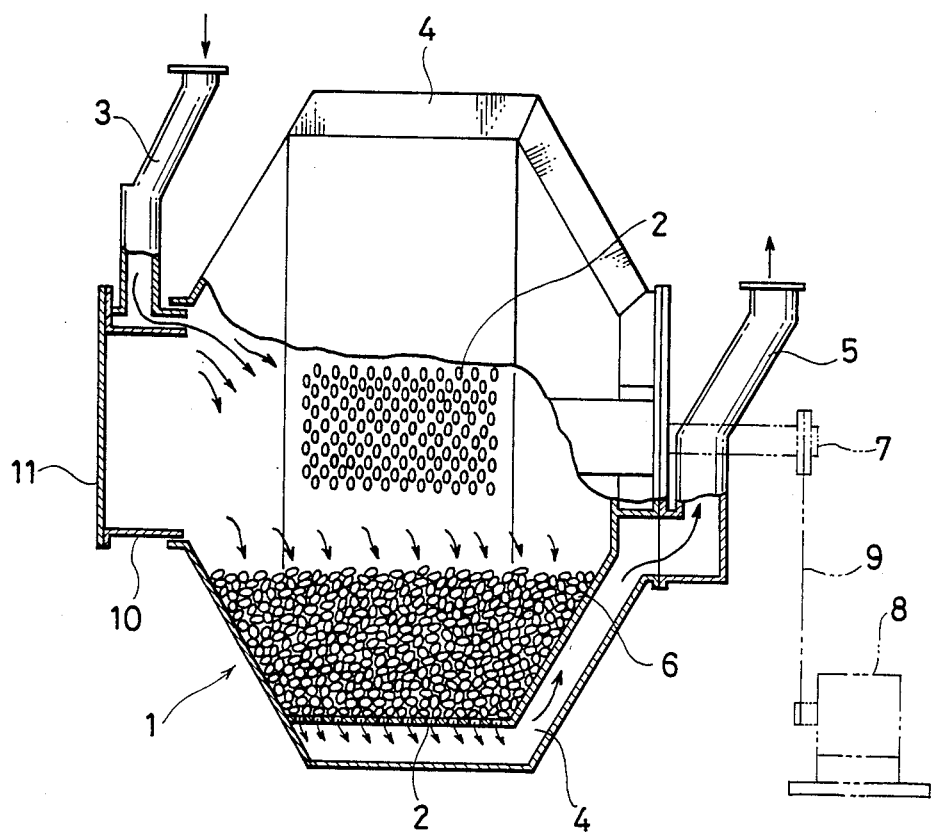
FIG. 1 is a side sectional view of a conventional coating apparatus shown partly in broken view.
Figure 2:
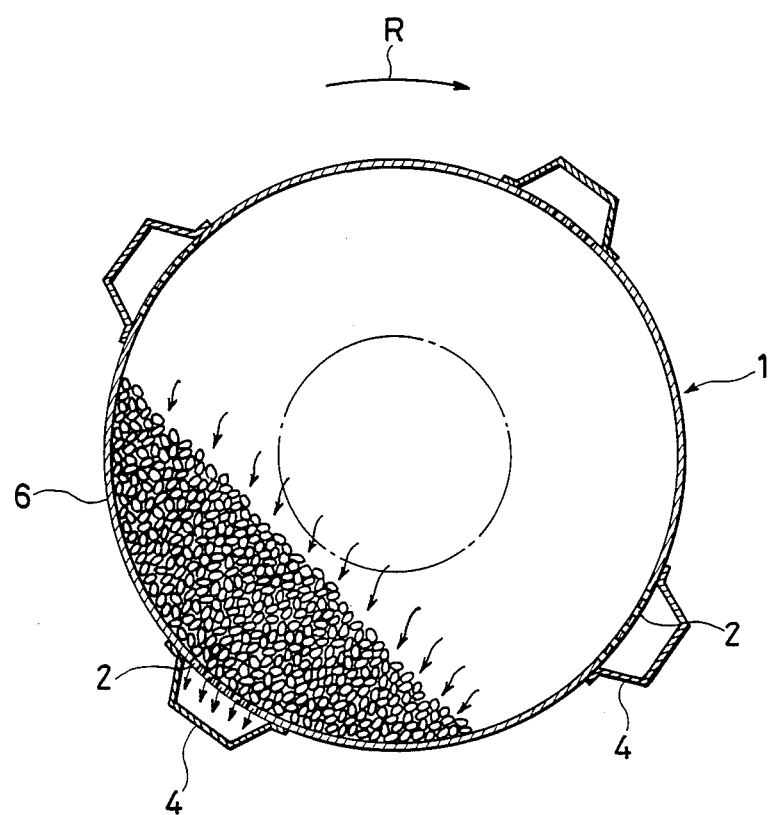
FIG. 2 is a general front sectional view of the apparatus shown in FIG. 1.

In this embodiment, the portions or members corresponding to those of the conventional structure shown in FIGS. 1 and 2 are depicted by the same reference numerals as the latter to avoid doubled description.

In the embodiment shown in FIG. 3, the rotatable coating pan 1 has a substantially conical side elevational shape. In the coating pan 1, there is provided a baffle or scoop means 12 having a tapered shape from the trailing edge 12b to the leading edge 12a relative to a rotational direction R of the coating pan 1 at a position to cover entirely or partially each perforated area 2 of the coating pan 1.

The baffle means 12 scoops the material to be coated, such as the tablets 6, other granular raw material or the like tumbled along the inner wall surface of the coating pan 1 due to the rotational movement of the coating pan 1 from the leading edge 12a to the trailing edge 12b, whereby the baffle means smoothes the flow of the tablets 6, improves the mixing and agitating of the tablets 6 and prevents the rate of charge from being reduced.

Therefore, as apparent from FIGS. 4 to 10, the baffle means 12 is constructed such that the leading edge 12a has a pointed tapered shape relative to the rotational direction R of the coating pan 1, the trailing edge 12b has a height H, to which the minimum height of the leading edge 12a is gradually increased along an inclined side edge 12c, and has a width W, to which the minimum width of the leading edge 12a is gradually increased, whereby the baffle means 12 is inclined both in the vertical and the horizontal directions. The bottom face of the side portion of the baffle means 12 is fixed to the inner wall surface of the coating pan 1 by welding etc. from the leading edge 12a to the trailing edge 12b. This baffle means 12 is formed at the trailing edge 12b thereof with a triangular ventilating opening 13, which is communicated with ventilating apertures 2a of the perforated area 2 formed in the wall surface of the coating pan 1, so that the flow of the gas 14 can flow into and out of the coating pan 1.

A ventilating member 15 formed of a mesh for ventilating the leak of the tablets 6 or the like is provided at the position of the ventilating opening 13 of the baffle means 12.

As for the dimensions of the baffle means 12 in this embodiment, there are generally adopted the following ranges, however, the dimensions may be further decreased.

Namely, the height H of the baffle means 12 (Refer to FIG. 7) is from one-third to one-twentieth of the inner diameter of the coating pan 1, the length L (Refer to FIG. 7) is from one-fourth to one-fortieth of the inner diameter of the coating pan 1, the width W (Refer to FIG. 6) is from one-half to one-twentieth of the axial length of the coating pan 1, an angle $\theta_1$ of the leading edge 12a in the rotational direction of the baffle means 12 is from 20° to 120° and an angle of inclination $\theta_2$ of the side edge 12c is from 10° to 90°.

In this embodiment, two tridimensional, hollow and triangular baffle means 12 are arranged integrally and in parallel to each other, however, three baffle means 12 may be arranged integrally and in parallel to one another, or a single baffle means may be used.

In this embodiment, a plurality of baffle means 12 are provided for the perforated areas 2 formed at four positions arranged in the circumferential direction of the coating pan 1, respectively.

The operation of this embodiment is described in the following.

At first, the cover 11 of the cylindrical portion 10 of the coating pan 1 is opened, and the tablets 6 as being the raw material to be coated are charged into the coating pan 1. Then, a desired coating solution is sprayed by a conventional spray mechanism, not shown, into the coating pan 1 through the cylindrical opening 10, and a layer of the coating material is formed on the tablets 6 tumbled along the inner wall surface of the coating pan 1 due to the rotational movement of the coating pan 1. Subsequently, the heated gas is blown into the coating pan 1 via the supply conduit 3, and flows through the bed of the tablets 6 coated with the coating material, and then, exhausted out of the coating pan 1 through the ventilating apertures 2a (Refer to FIG. 5) of the perforated area 2.

At that time, in this embodiment, as the baffle means 12 are provided on the inner wall surface of the coating pan 1, the tablets 6 tumbled along the inner wall surface of the coating pan 1 by the rotary movement of the coating pan 1 are scooped or raised on the baffle means 12 at the leading edge 12a thereof, then, along the inclined side wall surface of the baffle means 12, and pushed to the side of the baffle means 12.

In consequence, the flow of the tablets 6 is changed into a smooth one by the baffling action and scooping action of the baffle means 12 and the agitating and mixing between the tablets 6 with one another can be greatly facilitated.

Figure 11:
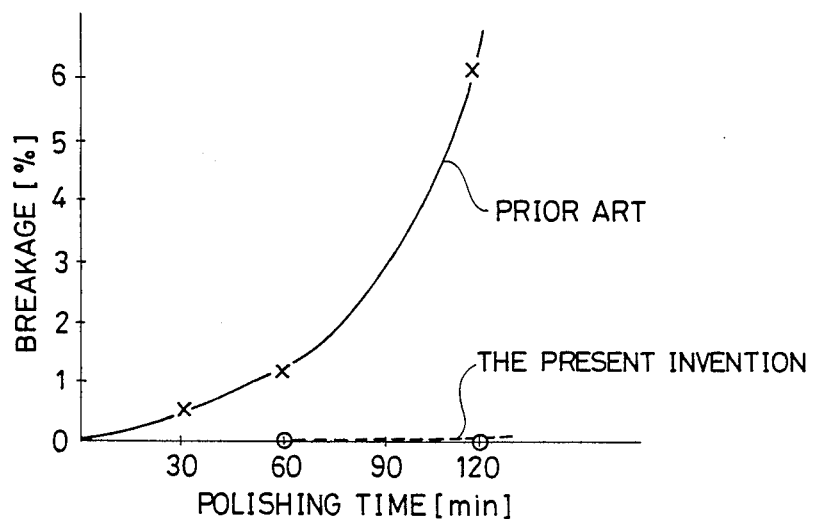
FIG. 11 is a view showing a comparison of the effect of preventing the tablets from being broken according to the present invention with that of the conventional technique.

Furthermore, in this embodiment, as shown in FIG. 11, the rate of occurrence of breakages at the time of polishing of the tablets 6 according to the present invention (indicated by a broken line) is by far lower than that in the prior art shown in FIGS. 1 and 2 (indicated by solid lines in FIG. 11), thereby enabling to obtain highly satisfactory effect of preventing the tablets from being broken.

Further, as for the prevention of the leakage of the raw material such as a dusting powder, according to experiments conducted by the present inventor, the effect of 12.3-20.0% was obtained in the prior art shown in FIG. 1, whereas 1.0% was achieved according to the present invention, thus enabling to attain an outstanding effect of preventing the powder leak.

Additionally, the smooth movement of the tablets 6 in the coating pan 1 makes it possible to minimize the noises during the coating operation.

Moreover, as for the maximum rate of charge, when it is determined to be 100% with no structure being present in the coating pan 1 as shown in FIGS. 1 and 2, the maximum rate of charge is 95.5% according to the present invention, whereby the rate of charge is slightly decreased.

FIGS. 12 to 34 are perspective views showing various embodiments of the baffle means according to the present invention.

Figure 12:
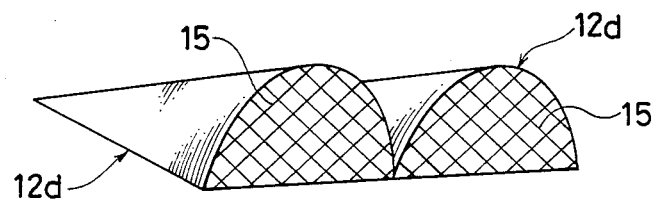
FIGS. 12 to 34 are perspective views showing other various embodiments of the baffle means according to the present invention.

At first, the baffle means in an embodiment shown in FIG. 12 is of such an arrangement that there are provided integrally and in parallel to each other two baffle means 12d, each of which is tapered such as to be decreased in height and width from the trailing edge to the leading edge and has a generally semicircular shape in cross section, so that the outstanding effects of agitating and mixing, preventing the breakages and so on can be obtained.

Figure 13:
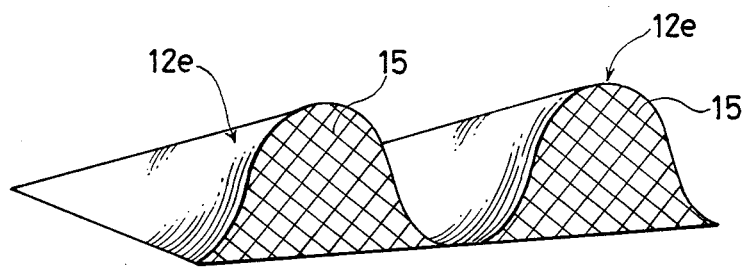

In an embodiment shown in FIG. 13, there are integrally arranged two tapered and wave-shaped baffle means 12e.

Figure 14:
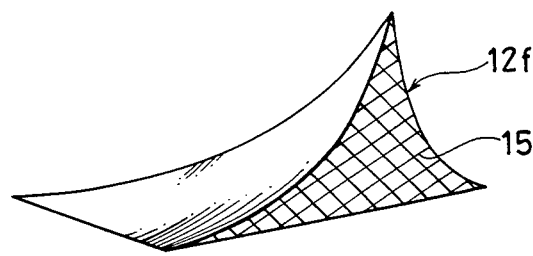

An embodiment shown in FIG. 14 shows a construction of a baffle means 12f of a curved-surfaced and tridimensional shape. In this case also, a satisfactory coating operation can be performed by the baffling action and scooping action by the baffle means 12f.

Figure 15:
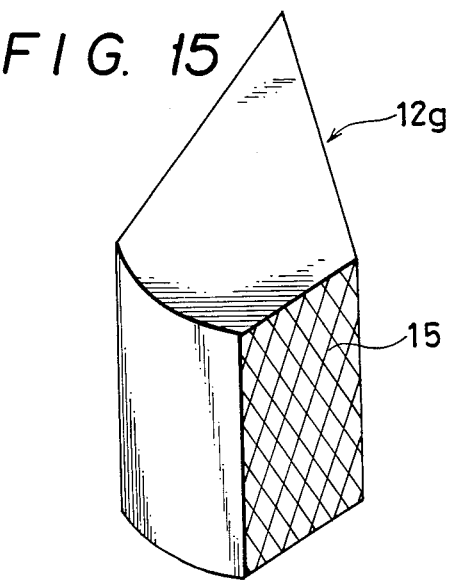

FIG. 15 shows a hollow baffle means 12g being of a generally wedge shape in the horizontal cross section. In the case of this baffle means 12g, when the bottom face thereof is secured to the inner wall surface of the coating pan 1, the baffle means 12g projects considerably long to the center of the coating pan, whereby a further larger buffling action can be obtained, so that a very good effect of agitating and mixing can be achieved.

Figure 16:
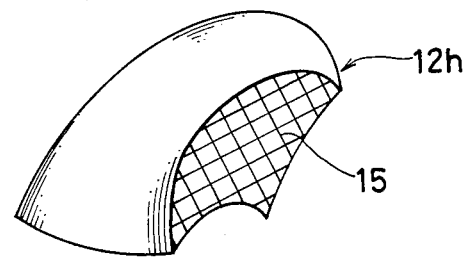

FIG. 16 shows a baffle means 12h being of a generally half-cup-formed and curved-surfaced shape.

Figure 17:
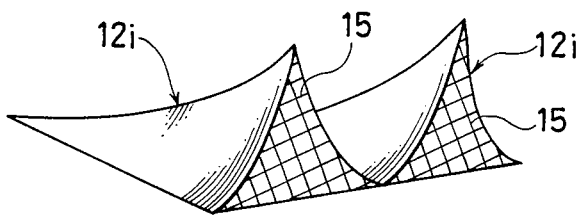

FIG. 17 shows two baffle means 12i each being of a curved-surfaced shape similar to the one shown in FIG. 14, which are integrally connected to each other.

Figure 18:
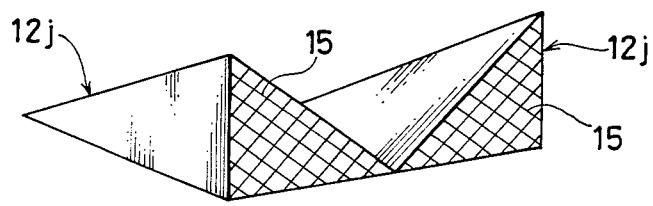

FIG. 18 shows two baffle means 12j each being of a right-angled triangular shape in cross section, which are arranged integrally and in parallel to each other.

Figure 19:
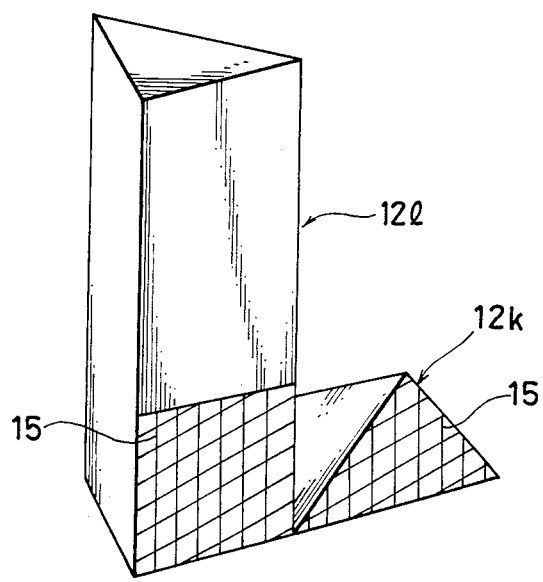

FIG. 19 shows a hollow and triangular baffle means 12k and a hollow tubular baffle means 12l being of a triangular shape in cross section, which are arranged integrally and in parallel to each other. In this case, the baffle means 12k mainly performs the tablet scooping action, while, the baffle means 12l mainly performs the baffling action, so that the combined effects of the agitating and mixing etc. can be attained generally.

Figure 20:
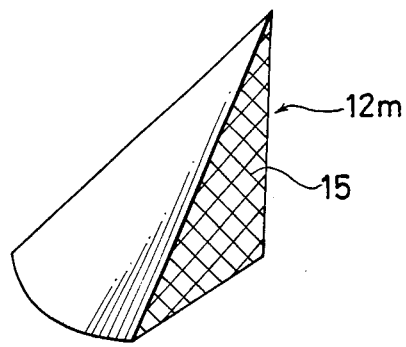
Figure 21:
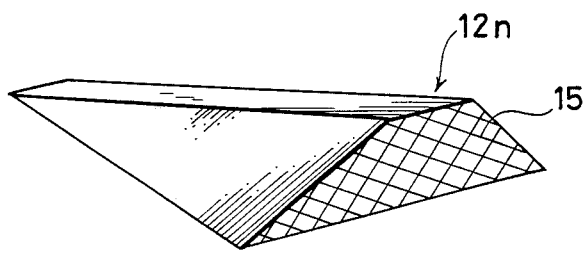
Figure 22:
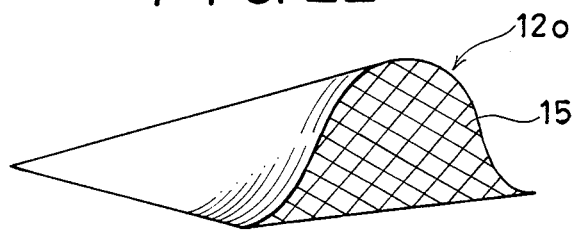

FIG. 20 shows a generally half-cone shaped baffle means 12 m, FIG. 21 a baffle means 12n being of a generally trapezoidal shape in cross section, and FIG. 22 a tapered and hollow baffle means 12o being of a generally waveshape in cross section, respectively.

Figure 23:
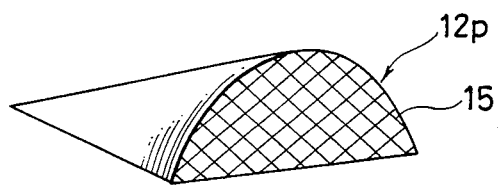
Figure 24:
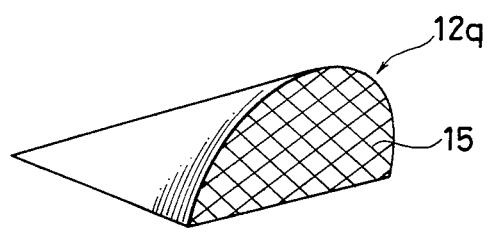
Figure 25:
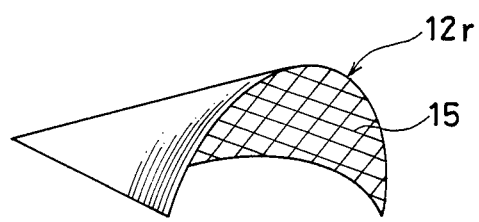

FIGS. 23, 24 and 25 show tapered and hollow baffle means 12p, 12q and 12r each being of a generally semi-circular shape in cross section.

Figure 26:
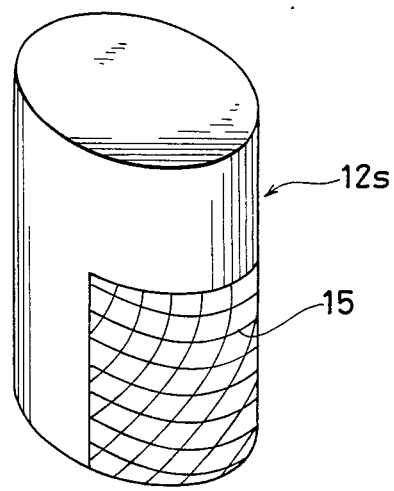
Figure 27:
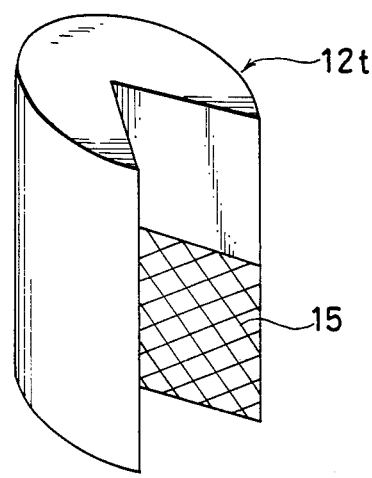
Figure 28:
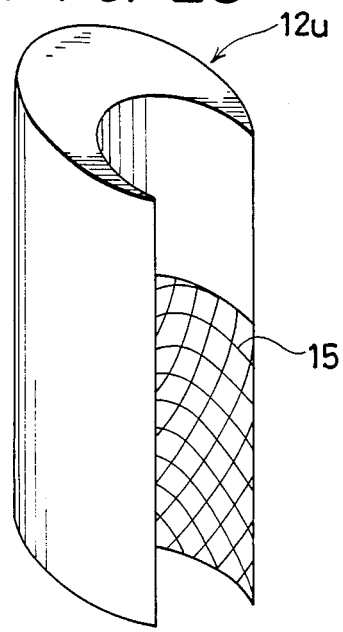

FIG. 26 shows a baffle means 12s being of a cylindrical shape, FIG. 27 a baffle means 12t being of a cylindrical shape with a groove being triangular in cross section, and FIG. 28 a baffle means 12u being of a cylindrical shape with a groove being round in cross section. These baffle means can give the satisfactory effects of agitating and mixing by the very large baffling action.

Figure 29:
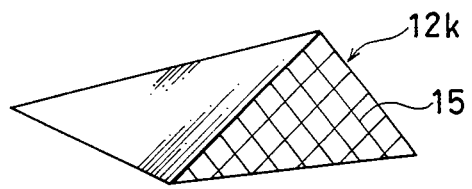
Figure 30:
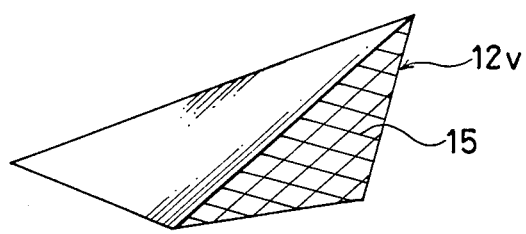
Figure 31:
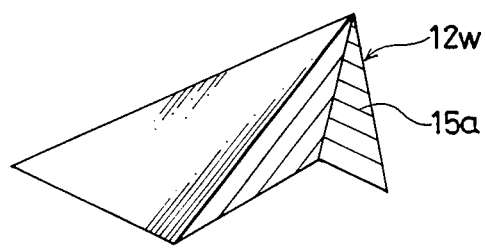

FIGS. 29, 30 and 31 show the construction of baffle means each being of a hollow and triangular shape. The baffle means shown in FIG. 29 has the construction of the baffle means 12k shown in FIG. 19 being used singly, the baffle means 12v shown in FIG. 30 has the height slightly larger than the baffle means 12k, and the baffle means 12w shown in FIG. 31 has the construction of combined triangular shapes. Furthermore, a ventilating member 15a in FIG. 31 is comprised of a mesh for preventing the powder leak, which is stretched in lines in one direction.

Figure 32:
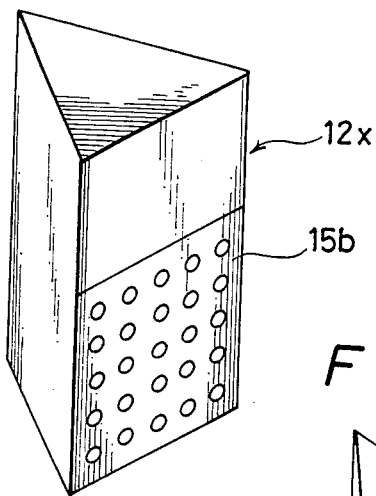
Figure 34:
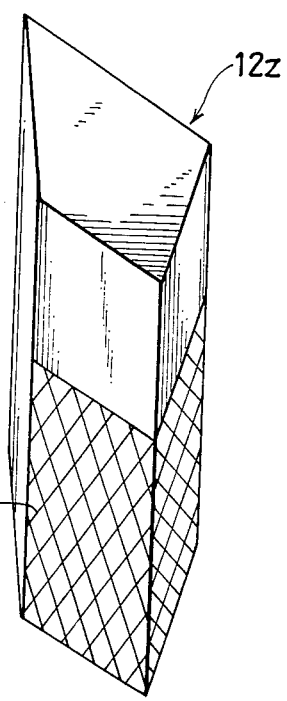
Figure 33:
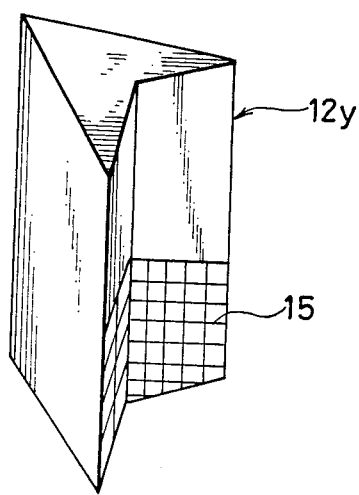

Further, baffle means 12x, 12y and 12z as shown in FIGS. 32, 33 and 34 are hollow and have a regular triangular shape, a deformed triangular shape and a square shape, in the horizontal cross section, respectively. In an embodiment shown in FIG. 32, a ventilating member 15b has a construction of preventing the powder leak, which is made of a perforated plate.

Additionally, the present invention need not necessarily be limited to the above embodiments, and other various modifications are adoptable.

Furthermore, the present invention is not only applicable to the conical type coating apparatus, but also applicable to the coating apparatuses of a cylindrical type, an onion type, a pear type and the like.

Further, the present invention is applicable to various fields of the coating treatments of foods, feedstuffs, agricultural medicines, manures, toners etc. in addition to the pharmaceuticals such as the tablets in the above embodiments. If desired, the present apparatus may be used for granulation.

As has been described hereinabove, according to the present invention, there are provided the hollow baffle means constructed such that each of said baffle means is at least partially increased in width from the leading edge to the trailing edge relative to the rotational direction of the coating pan, and has the ventilating opening communicated with the ventilating areas, so that the following outstanding combined effects can be achieved.

(1) The flow of the raw material to be coated can be smoothed and the effect of agitating and mixing the raw material to be coated can be improved.

(2) The raw material to be coated can be prevented from being damaged or generating noises.

(3) Leak of raw material from the ventilating areas of the coating pan can be prevented.

(4) Lowered rate of charge due to the provision of the baffle means can be controlled.

(5) The baffle means project satisfactorily long to the interior of the coating pan, so that far larger effect of agitating and mixing can be obtained.

What is claimed is:

1. A coating apparatus including a rotatable coating pan, said coating pan being provided on a peripheral sidewall thereof with ventilating areas, wherein said apparatus is further provided at positions covering said ventilating areas with baffle means including:
    a leading edge having a pointed tapered shape relative to the rotational direction of the coating pan;
    a trailing edge having a height, to which the minimum height of the leading edge is gradually increased and a width, to which the minimum width of the leading edge is gradually increased;
    a bottom face fixed to the inner wall surface of the coating pan from the leading edge to the trailing edge;
    an inclined side edge extending gradually from the leading edge to the trailing edge maximum height;
    the baffle means having two non-perforated inclined surfaces and having a triangular ventilating opening at said trailing edge, which is communicated with ventilating apertures of the perforated area formed in the wall surface of the coating pan,
    whereby articles treated in said coating apparatus are scooped up at the leading edge of said baffle means and tend to flow smoothly down said inclined surface and over said trailing edge as said coating pan is rotated.

2. The coating apparatus as set forth in claim 1, wherein the baffle means are two three-dimensional, hollow triangular baffle means which are arranged integrally and in parallel to each other.

3. The coating apparatus as set forth in claim 2, wherein baffle means are provided at four positions equidistantly along the peripheral side wall of said coating pan.

* * * * *